United States Patent
Ionkin

(10) Patent No.: US 8,470,288 B2
(45) Date of Patent: *Jun. 25, 2013

(54) PREPARATION OF CZTS IN AN IONIC LIQUID

(75) Inventor: Alex Sergey Ionkin, Kennett Square, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/505,833

(22) PCT Filed: Nov. 23, 2010

(86) PCT No.: PCT/US2010/057762
§ 371 (c)(1),
(2), (4) Date: May 3, 2012

(87) PCT Pub. No.: WO2011/066264
PCT Pub. Date: Jun. 3, 2011

(65) Prior Publication Data
US 2012/0219492 A1     Aug. 30, 2012

Related U.S. Application Data

(60) Provisional application No. 61/264,378, filed on Nov. 25, 2009.

(51) Int. Cl.
*C01B 17/00* (2006.01)
*C01B 19/00* (2006.01)

(52) U.S. Cl.
USPC .......................................... 423/508; 423/511

(58) Field of Classification Search
USPC ........................................... 423/508, 511
See application file for complete search history.

(56) References Cited

U.S. PATENT DOCUMENTS

2010/0260661 A1 * 10/2010 Hwang et al. ............... 423/508
2012/0201742 A1 * 8/2012 Ionkin ........................ 423/511

OTHER PUBLICATIONS

Todorov, T. et al., Cu2ZnSnS4 films deposited by a soft-chemistry method, Thin Solid Films, 2009, pp. 2541-2544, vol. 517.
Meindersma, G. Wytze et al., Ionic Liquids, Ullmann's Encyclopedia of Industrial Chemistry, 2007, pp. 1-33.

* cited by examiner

*Primary Examiner* — Timothy Vanoy

(57) ABSTRACT

The present invention relates to synthesis of copper zinc tin sulfide, $Cu_2ZnSnS_4$ (CZTS) in an ionic liquid, using a mixture of copper-containing sulfides, zinc-containing sulfides, and tin-containing sulfides. $Cu_2ZnSnS_4$ is useful as an absorber material in thin film solar cells.

10 Claims, No Drawings

PREPARATION OF CZTS IN AN IONIC LIQUID

This applications claims the benefit of U.S. Provisional Patent Application No. 61/264,378 filed Nov. 25, 2009.

FIELD OF THE INVENTION

The present invention relates to synthesis of copper zinc tin sulfide, $Cu_2ZnSnS_4$ (CZTS) in an ionic liquid. $Cu_2ZnSnS_4$ is useful as an absorber material in thin film solar cells.

BACKGROUND

Solar cells, also termed photovoltaic or PV cells, convert sunlight into electricity. Traditionally, these electronic devices have been fabricated using silicon (Si) as a light-absorbing, semiconducting material in a relatively expensive production process. To make solar cells more economically viable, solar cell device architectures have recently been developed that use thin-film, light-absorbing semiconductor materials such as copper-indium-gallium-sulfo-di-selenide, also termed CIGS.

Despite the demonstrated potential of CIGS in thin-film solar cells, the toxicity and low abundance of indium and selenium are major impediments to the widespread use and acceptance of CIGS in commercial devices. Attractive alternatives to CIGS include quaternary chalcogenides, particularly copper zinc tin sulfide, $Cu_2ZnSnS_4$ (CZTS). It has a bandgap of about 1.5 eV, well within the solar spectrum, and an absorption coefficient greater than 104 cm$^{-1}$. In addition, the CZTS elements are non-toxic and abundant.

CTZS has been produced from solution using ultrasonic or microwave initiation. In some instances, additional additives have been employed in processes to produce the chalcogenide analogs. CZTS has also been produced by vapor deposition techniques.

There remains a need for a robust process to produce CZTS at a commercial scale.

SUMMARY

One aspect of the invention is a process for forming CZTS, comprising heating a reaction mixture in an inert atmosphere to a temperature of between about 300° C. and about 600° C., wherein the reaction mixture comprises:
a) an ionic liquid;
b) a copper-containing sulfide;
c) a zinc-containing sulfide; and
d) a tin-containing sulfide; and
wherein the molar ratio of Cu:Zn:Sn:S is about 2:1:1:4.

DETAILED DESCRIPTION

Described herein is a process for forming CZTS, comprising is heating a reaction mixture in an inert atmosphere to a temperature of between about 300° C. and about 600° C., wherein the reaction mixture comprises:
a) an ionic liquid;
b) a copper-containing sulfide;
c) a zinc-containing sulfide;
d) a tin-containing sulfide; and
wherein the molar ratio of Cu:Zn:Sn:S is about 2:1:1:4. CZTS is formed from the process.

Herein, the term "CZTS" refers to $Cu_2ZnSnS_4$, and further encompasses copper zinc tin sulfide compositions with a range of stoichiometries, such as but not limited to $Cu_{1.94}Zn_{0.63}Sn_{1.3}S_4$. That is, the molar ratio of the elements can vary from strictly 2 Cu:1 Zn:1 Sn:4S and can also be doped by small amounts of other elements such as sodium or iron.

By "copper-containing sulfide" it is meant a composition comprising copper and sulfur. Suitable copper-containing sulfides include copper(I) sulfide, copper (II) sulfide, copper tin sulfide, copper zinc sulfide, copper zinc tin sulfide, and mixtures thereof.

By "zinc-containing sulfide" it is meant a composition comprising zinc and sulfur. Suitable zinc-containing sulfides include zinc (II) sulfide, copper zinc sulfide, zinc tin sulfide, copper zinc tin sulfide, and mixtures thereof.

By "tin-containing sulfide" it is meant a composition containing tin and sulfur. Suitable tin-containing sulfides include tin (II) sulfide, tin (IV) sulfide, copper tin sulfide, zinc tin sulfide, copper zinc tin sulfide, and mixtures thereof.

In one embodiment the copper-containing sulfide comprises a copper sulfide, the zinc-containing sulfide comprises zinc sulfide, and the tin-containing-sulfide comprises a tin sulfide.

The reaction mixture has a molar ratio of Cu:Zn:Sn:S in about 2:1:1:4. The molar ratios of Cu, Zn, and Sn can deviate from integer ratios by about 20 molar %, such that suitable ratios include Cu:Zn:Sn from 2 to 0.8 to 0.8 up to 2 to 1.2 to 1.2.

The metal sulfides are dispersed or dissolved in the ionic liquid to form the reaction mixture. "Ionic liquids" are organic salts that are fluid at or below about 100° C., and preferably at or below about room temperature (about 25° C.). Ionic liquids comprise a cationic component and an anionic component. Typically, the cationic component is organic and the anionic component is either inorganic or organic. Suitable ionic liquids are inert to all reagents and products, and are stable or essentially non-volatile at reaction temperatures. One ionic liquid or a mixture may be used.

Suitable cationic components of the ionic liquid are described by the following formulae:

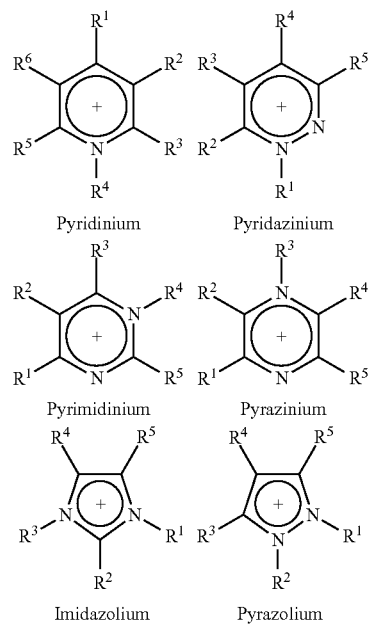

Pyridinium   Pyridazinium

Pyrimidinium   Pyrazinium

Imidazolium   Pyrazolium

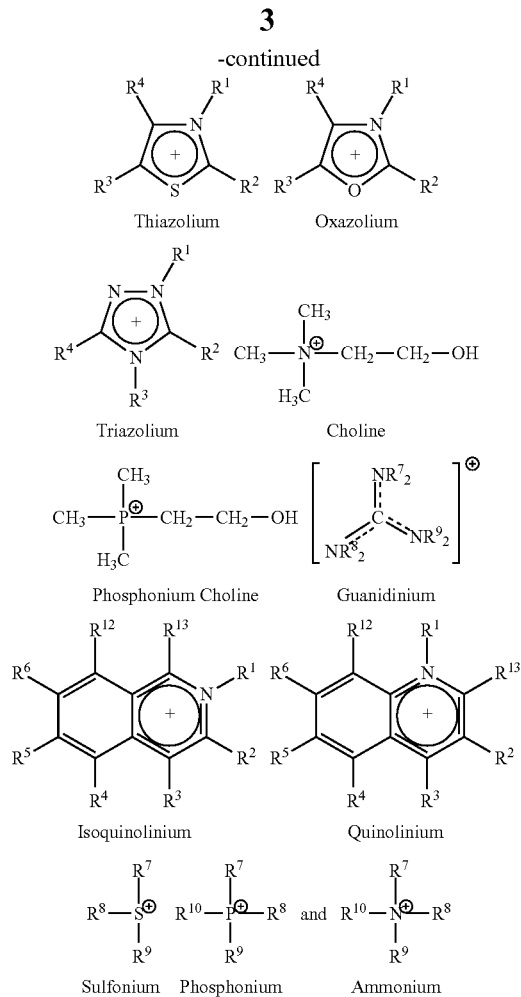

Thiazolium
Oxazolium
Triazolium
Choline
Phosphonium Choline
Guanidinium
Isoquinolinium
Quinolinium
Sulfonium  Phosphonium  Ammonium wherein $R^1$, $R^2$, $R^3$, $R^4$, $R^5$, $R^6$, $R^{12}$ and $R^{13}$ are independently selected from the group consisting of:
(i) H;
(ii) halogen;
(iii) —$CH_3$, —$C_2H_5$, or $C_3$ to $C_{25}$ straight-chain, branched or cyclic alkane or alkene, optionally substituted with at least one member selected from the group consisting of Cl, Br, F, I, OH, $NH_2$, and SH;
(iv) —$CH_3$, —$C_2H_5$, or $C_3$ to $C_{25}$ straight-chain, branched or cyclic alkane or alkene comprising one to three heteroatoms selected from the group consisting of O, N, Si and S, and optionally substituted with is at least one member selected from the group consisting of Cl, Br, F, I, OH, $NH_2$ and SH;
(v) $C_6$ to $C_{20}$ unsubstituted aryl, or $C_3$ to $C_{25}$ unsubstituted heteroaryl having one to three heteroatoms independently selected from the group consisting of O, N, Si and S; and
(vi) $C_6$ to $C_{25}$ substituted aryl, or $C_3$ to $C_{25}$ substituted heteroaryl having one to three heteroatoms independently selected from the group consisting of O, N, Si and S; and wherein said substituted aryl or substituted heteroaryl has one to three substituents independently selected from the group consisting of:
(1) —$CH_3$, —$C_2H_5$, or $C_3$ to $C_{25}$ straight-chain, branched or cyclic alkane or alkene, optionally substituted with at least one member selected from the group consisting of Cl, Br, F I, OH, $NH_2$ and SH;
(2) OH;
(3) $NH_2$; and
(4) SH;
(vii) —$(CH_2)_nSi(CH_2)_mCH_3$, —$(CH_2)_nSi(CH_3)_3$, —$(CH_2)_nOSi(CH_3)_m$, where n is independently 1, 2, 3 or 4 and m is independently 0, 1, 2, 3, or 4, and wherein the Si is tetravalent; and $R^7$, $R^6$, $R^9$, and $R^{10}$ are independently selected from the group consisting of:
(viii) —$CH_3$, —$C_2H_5$, or $C_3$ to $C_{25}$ straight-chain, branched or cyclic alkane or alkene, optionally substituted with at least one member selected from the group consisting of Cl, Br, F, I, OH, $NH_2$ and SH;
(ix) —$CH_3$, —$C_2H_5$, or $C_3$ to $C_{25}$ straight-chain, branched or cyclic alkane or alkene comprising one to three heteroatoms selected from the group consisting of O, N, Si and S, and optionally substituted with at least one member selected from the group consisting of Cl, Br, F, I, OH, $NH_2$ and SH;
(x) $C_6$ to $C_{25}$ unsubstituted aryl, or $C_3$ to $C_{25}$ unsubstituted heteroaryl having one to three heteroatoms independently selected from the group consisting of O, N, Si and S; and
(xi) $C_6$ to $C_{25}$ substituted aryl, or $C_3$ to $C_{25}$ substituted heteroaryl having one to three heteroatoms independently selected from the group consisting of O, N, Si and S; and wherein said substituted aryl or substituted heteroaryl has one to three substituents independently selected from the group consisting of:
(1) —$CH_3$, —$C_2H_5$, or $C_3$ to $C_{25}$ straight-chain, branched or cyclic alkane or alkene, optionally substituted with at least one member selected from the group consisting of Cl, Br, F, I, OH, $NH_2$ and SH,
(2) OH,
(3) $NH_2$, and
(4) SH; and
(xii) —$(CH_2)_nSi(CH_2)_mCH_3$, —$(CH_2)_nSi(CH_3)_3$, $(CH_2)_nOSi(CH_3)_m$, where n is independently 1, 2, 3 or 4 and m is independently 0, 1, 2, 3, or 4, and wherein the Si is tetravalent;
wherein optionally at least two of $R^1$, $R^2$, $R^4$, $R^5$, $R^6$, $R^7$, $R^8$, $R^9$, and $R^{10}$ can together form a ring.

Suitable anionic components of the ionic liquid include: chloroaluminate, bromoaluminate, tetrachloroborate, p-toluenesulfonate, tetrabromoaluminate, perchlorate, hydroxide anions, $[CH_3CO_2]^-$, $[HSO_4]^-$, $[CH_3OSO_3]^-$, $[C_2H_5OSO_3]^-$, $[AlCl_4]^-$, $[CO_3]^{2-}$, $[HCO_3]^-$, $[NO_2]^-$, $[NO_3]^-$, $[SO_4]^{2-}$, $[PO_3]^{3-}$, $[HPO_3]^{2-}$, $[H_2PO_3]^{1-}$, $[PO_4]^{3-}$, $[HPO_4]^{2-}$, $[H_2PO_4]^-$, $[HSO_3]^-$, $[CuCl_2]^-$, halide $[Cl^-, Br^-, I^-]$, $SCN^-$; $BR^1R^2R^3R^4$, $BOR^1OR^2OR^3OR^4$, $[BF_4]^-$, $[PF_6]^-$, $[SbF_6]^-$, $[CF_3SO_3]^-$, $[HCF_2CF_2SO_3]^-$, $[CF_3HFCCF_2SO_3]^-$, $[HCClFCF_2SO_3]^-$, $[(CF_3SO_2)_2N]^-$, $[(CF_3CF_2SO_2)_2N]^-$, $[(CF_3SO_2)_3C]^-$, $[CF_3CO_2]^-$, $[CF_3OCFHCF_2SO_3]^-$, $[CF_3CF_2OCFHCF_2SO_3]^-$, $[CF_3CFHOCF_2CF_2SO_3]^-$, $[CF_2HCF_2OCF_2CF_2SO_3]^-$, $[CF_2ICF_2OCF_2CF_2SO_3]^-$, $[CF_3CF_2OCF_2CF_2SO_3]^-$, $[(CF_2HCF_2SC_2)_2N]^-$, $[(CF_3CFHCF_2SO_2)_2N]^-$; and $F^-$.

Other suitable anionic components include those represented by the structure of the following formula:

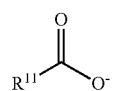

wherein $R^{11}$ is selected from the group consisting of:
(i) —$CH_3$, —$C_2H_5$, or $C_3$ to $C_{10}$ straight-chain, branched or cyclic alkane or alkene, optionally substituted with at least one member selected from the group consisting of Cl, Br, F, I, OH, $NH_2$ and SH;

(ii) —CH$_3$, —C$_2$H$_5$, or C$_3$ to C$_{10}$ straight-chain, branched or cyclic alkane or alkene comprising one to three heteroatoms selected from the group consisting of O, N, Si and S, and optionally substituted with at least one member selected from the group consisting of Cl, Br, F, I, OH, NH$_2$ and SH;

(iii) C$_6$ to C$_{10}$ unsubstituted aryl, or C$_3$ to C$_{10}$ unsubstituted heteroaryl having one to three heteroatoms independently selected from the group consisting of O, N, Si and S; and (iv) C$_6$ to C$_{10}$ substituted aryl, or C$_3$ to C$_{10}$ substituted heteroaryl having one to three heteroatoms independently selected from the group consisting of O, N, Si and S; and wherein said substituted aryl or substituted heteroaryl has one to three substituents independently selected from the group consisting of:

(1) —CH$_3$, —C$_2$H$_5$, or C$_3$ to C$_{10}$ straight-chain, branched or cyclic alkane or alkene, optionally substituted with at least one member selected from the group consisting of Cl, Br, F I, OH, NH$_2$ and SH;

(2) OH;

(3) NH$_2$; and (4) SH.

Suitable anionic components also include aminoacetate (glycine), ascorbate, benzoate, catecholate, citrate, dimethylphosphate, formate, fumarate, gallate, glycolate, glyoxylate, iminodiacetate, isobutyrate, kojate (5-hydroxy-2-hydroxymethyl-4-pyrone ion), lactate, levulinate, oxalate, pivalate, propionate, pyruvate, salicylate, succinamate, succinate, tiglate (CH$_3$CH═C(CH$_3$)COO$^-$), and tropolonate (2-hydroxy-2,4,6-cycloheotatrien-1-one ion).

Other suitable anionic components are based on phosphorus compounds as represented by the following structures, wherein R$^1$ and R$^2$ are as set forth above:

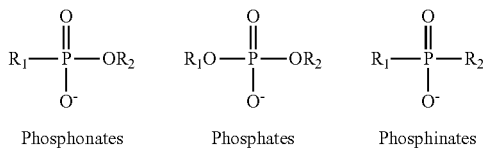

Phosphonates    Phosphates    Phosphinates

In one embodiment, the ionic liquid comprises tributylmethylammonium, 1,2,4-trimethylpyrazolium, or 1,2,3-trimethylpyrazolium as the cation, and methylsulfate as the anion.

Some suitable ionic liquids are formed by reacting a nitrogen-containing heterocyclic ring, preferably a heteroaromatic ring, with an alkylating agent (for example, an alkyl halide) to form a quaternary ammonium salt, followed by an ion exchange or reaction with a Lewis acid or its conjugate base to form the ionic liquid. Ionic liquids suitable for use herein can also be synthesized by salt metathesis, by an acid-base neutralization reaction, or by quaternizing a selected nitrogen-containing compound. Many ionic liquids are also available from commercial sources.

Typically, this process is carried out in an open container under an inert atmosphere. The open container can be made out of any material that is inert to the reaction mixture, such as alumina, aluminum nitride, magnesia, magnesia with alumina, zirconia, zirconia with yttrium oxide, graphite, platinum, and alloys of platinum, gold and rhodium. The open container can have any shape OF size, such as but not limited to combustion boats, crucibles, incineration trays, incineration dishes, and the bottom floor of an oven or furnace.

The reaction mixture can be prepared by combining the individual components either before or after being placed in the container. The sulfides can be pre-milled separately, or after combining into the mixture. The combining can be done by any means as long as the sulfides are homogenized, such as by grinding, shaking, or ball milling. Typically, the particle sizes of sulfides are between 350 mesh size and 5 mesh size, or between 200 and 325 mesh sizes. After combining, the sulfide mixture can be in powder form, or formed into any shape, such as a pressed pellet.

The composition is heated in a container in an inert atmosphere. By "inert atmosphere" it is meant an atmosphere that is inert to the reaction mixture. Suitable examples include helium, neon, argon, krypton, xenon, nitrogen and mixtures thereof. Atmospheres containing water, oxygen, or H$_2$S are particularly to be avoided. The inert atmosphere can be streamed or flowed over the container during the heating step.

The reaction mixture is heated to a temperature of about 300° C. to about 500° C., or about 300° C. to about 400° C. The temperature is not critical and is dependent on the desired conversion rate and the thermal stability of the ionic liquid. The heating can be performed in any manner, such as in one step, ramping or stepping to the upper temperature, or cycling between the lower and the upper temperature. The heating can be performed using any means, such as in a tube furnace. The reaction mixture can be heated gradually starting at ambient temperature, or can be placed directly into a hot furnace or reactor.

The reaction time is not critical and depends on the desired conversion rate, and can be between a few minutes to several days. Reaction times are typically about 15 minutes, 6 hours or 12 hours up to about 2, 3 or 5 days.

After heating and optional cooling, the CZTS product can be isolated as a solid directly from the open container and may, for some applications, be used without further purification. The product is typically cooled to ambient temperature under inert atmosphere to prevent oxidation or hydrolysis. The method can further comprise isolating the product. This can be done by any known means, including filtration or centrifugation, and/or rinsing with water, an alcohol, or a mixture thereof.

Optionally, the CZTS can be rinsed with water or other polar solvent, such as an alcohol, and dried.

The CZTS prepared by the method described above can be useful in the fabrication of electronic devices such as photovoltaics.

EXAMPLE

A mixture of 2.176 g (22.8 mmol) of copper sulfide, 1.11 g (11.38 mmol) of zinc sulfide, 2.080 g (11.38 mmol) of tin(IV) sulfide and 10 g of 1,2,3-trimethylpyrazolium methylsulfate was placed in a 20 ml alumina boat. The alumina boat was placed in a tube furnace under a nitrogen flow. The boat was heated in 100 degree intervals up to 400° C., and maintained at 400° C. under a nitrogen flow for 24 hr. After cooling to ambient temperature under a flow of nitrogen, the boat was submerged in 250 ml of distilled water in a beaker. The resulting black precipitate was filtered, washed twice by 100 ml of distilled water, dried for 12 hr in 1.0 mm vacuum. The yield of black powder was 3.20 g (64%). Analysis of the black powder by XRD confirmed the presence of CZTS.

What is claimed is:

1. A process for forming CZTS, comprising heating a reaction mixture in an inert atmosphere to a temperature of between about 300° C. and about 500° C., wherein the reaction mixture comprises:
    a) an ionic liquid;
    b) a copper-containing sulfide;
    c) a zinc-containing sulfide; and
    d) a tin-containing sulfide; and
    wherein the molar ratio of Cu:Zn:Sn:S is about 2:1:1:4.

2. The process of claim 1, wherein the composition is heated to a is temperature of about 300° C. to about 400° C.

3. The process of claim 1, wherein the composition is heated for about 6 hours to about 5 days.

4. The process of claim 1, wherein the copper-containing sulfide comprises a copper sulfide, the zinc-containing sulfide comprises zinc sulfide, and the tin-containing-sulfide comprises a tin sulfide.

5. The process of claim 1, wherein the inert atmosphere is flowed over the reaction mixture during the heating.

6. The process of claim 1, further comprising cooling the reaction mixture.

7. The process of claim 1, further comprising isolating the CZTS.

8. The process of claim 1, further comprising separating the CZTS from the ionic liquid.

9. The process of claim 8, wherein the separating comprises filtration or centrifugation.

10. The process of claim 8, wherein the separating comprises rinsing the CZTS with water, an alcohol or a mixture thereof.

\* \* \* \* \*